April 23, 1968   P. KUNTZMANN   3,379,072
CHAIN LINK AND CHAIN INCLUDING SAID LINK
Filed Oct. 23, 1965   3 Sheets-Sheet 1

United States Patent Office 3,379,072
Patented Apr. 23, 1968

3,379,072
CHAIN LINK AND CHAIN INCLUDING
SAID LINK
Paul Kuntzmann, Villejuif, France, assignor to Compagnie des Transmissions Mecaniques Seine-Doubs-Isere, Levallois-Perret, Seine, France, a French body corporate
Filed Oct. 23, 1965, Ser. No. 503,951
Claims priority, application France, Jan. 29, 1965, 3,664
9 Claims. (Cl. 74—251)

ABSTRACT OF THE DISCLOSURE

A link for a transmission chain comprising two link plates each having two apertures therein, and two elements disposed in said apertures, disposed perpendicular to the plates and interconnecting the plates, at least one of said elements being a pin having adjacent an end portion thereof, a conical portion which is convergent outwardly of the link towards said end portion of the pin and engaged in one of said apertures which has a conical shape, the same apex angle and the same diameter as said conical portion, and axial clamping means axially fixed to said end portion of said pin and engaged against the side of the corresponding plate having said conical aperture opposed to said conical portion of the pin and tightly applying the conical portion in said conical aperture.

---

The present invention relates to endless transmission chains and the like comprising alternating inside and outside links. The inside links are usually constituted by two inside plates interconnected by two bushings which are tightly fitted in two apertures provided for this purpose in each of the plates. The articulation pins interconnecting the links extend through the bores of the bushings and are interconnected by two outside plates each of which is provided with two apertures in which are fitted each of the pins with a tight radial fit so as to form an outside link. Consequently, if there is considered a section of chain constituted by alternating inside and outside links, owing to the fact of the tight fits, none of the constituent links is easily disassembled. Thus, in order to be in a position to open easily a closed chain, one or several outside links of this chain is usually replaced by a connecting link which is easily disassembled.

A first known arrangement of connecting links comprises replacing a plate having a tight fit of an outside link by a detachable plate which has two apertures having a diameter slightly greater than that of the pins and is retained by any known means, such as, for example, a nut, retaining pin or circlip. One of the drawbacks of such an arrangement is that, since the overall dimension of the apertures of the two plates is not the same, the two pins of the link are not parallel to each other and this results in an abnormal and accelerated wear of this link. Another drawback, resulting from the lack of parallelism of the pins, is that the fixed plate on which the two pins are mounted with a tight fit undergoes bending stress which rapidly puts it out of use. A third drawback is that a plate having pin-clearing apertures has a fatigue limit distinctly lower than that of a plate dimensioned for a tight fit with the pins for given outside dimensions.

A second arrangement for avoiding the drawbacks of the aforementioned known first arrangement comprises employing two plates having pin-clearing apertures, but in this case it is necessary to prevent the pins from rotating, for example by means of a flat portion so that the rotation of one link with respect to the other produces a rotation of the pin in the bushing of the adjacent link and not in the plates since otherwise the wear of the pin would be very rapid. However, this constitutes a serious complication in the machining.

Moreover, a part of the drawbacks of the first-mentioned arrangement, are again met with. The two plates having pin-clearing apertures have, indeed, a fatigue limit lower than that of plates of the chain having a tight fit with the pins, if the links have the same dimensions. The connecting link is no longer rigid and can act somewhat in the manner of a deformable parallelogram which also results in an accelerated and abnormal wear of the pins. Finally, the flat portion provided for stopping the pin from rotating under the effect of alternating pivoting of the chain pins buts against its housing or aperture and acts as a wedge and hammers the flat portion provided in the plate. As a result of fatigue phenomena, the plates and/or the pins are rapidly destroyed.

The main object of the present invention is to provide an improved link for a transmission or like chain, this link being easily disassembled and affording an assembly without clearance and an exact perpendicularity of the pins and plane faces of the plates.

The invention provides a link wherein at least one of the pins thereof comprises at least one end a cone of revolution disposed in and bearing in an aperture which has a conical bore, the same apex angle and the same diameter as said cone and is provided for this purpose in the adjacent plate, axial clamping means being provided for applying said cone in the aperture. The clamping means can be for example a nut, a spring, or a split resilient ring.

Another object of the invention is to provide a transmission or like chain provided with at least one link of the aforementioned improved type.

Further features and advantages of the invention will be apparent from the ensuing description with reference to the accompanying drawings to which the invention is in no way limited.

Figure 1:
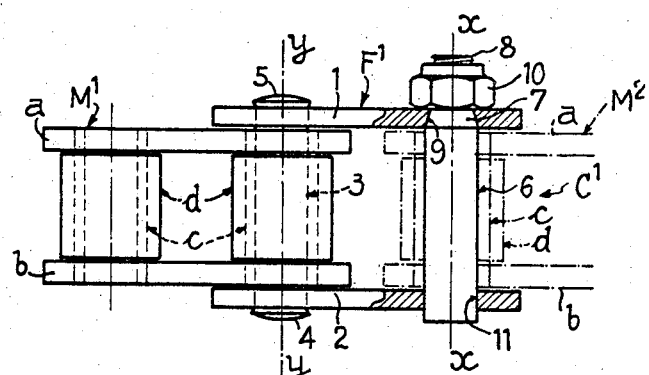
FIG. 1 is a plan view, with parts cut away, of a link according to the invention articulated to a link of the remainder of the chain.

In the embodiment shown in FIG. 1, two conventional outside links $M^1$, $M^2$ of a chain $C^1$ are shown interconnected by the improved link $F^1$. FIG. 1 shows the conventional construction of the links $M^1$ and $M^2$ which are inside links having plates $a$, $b$, riveted bushing $c$, and a roller $d$.

The link according to the invention is an outside link. It comprises two plates 1 and 2 which are interconnected in a conventional manner by a first pin 3 which extends through one of the bushings c and the plates a and b of the link M¹ and is tightly fitted in the plates 1 and 2, and riveted at 4 and 5.

The other pin 6 of the link F¹ has an axis x—x and is cylindrical over the major part of its length but includes near one end a conical portion 7 and a screw-threaded portion 8 extending therefrom. Further, the plate 1 comprises an aperture 9 which is also conical; the apex angle of the portion 7 is the same as that of the aperture 9 and the conical surfaces taper convergently on the axis x—x outwardly of the link. The conical aperture 9 has its maximum diameter equal to the diameter of the cylindrical portion of the pin 6 and the length of the conical portion 7 is slightly less than the thickness of the plate 1 so that when the aperture 9 is fitted over the conical portion 7 of the pin 6 and secured by means of the nut 10 threadedly engaged on the screwthreaded portion 8, there is an exact positioning without clearance of the pin 6 in the plate 1. The pin 6 merely extends through a free and circular aperture 11 in the plate 2.

It will be understood that in normal operation, since the pin 6 is rigidly secured to the plate 1 and is engaged without clearance in the plate 2, the axis x—x of pin 6 remains strictly parallel to the axis y—y corresponding to the articulation of the link F¹ to the link M¹.

When disassembling it is sufficient, after having removed the nut 10, to give a slight tap on the plate 1 or on the pin 6 to detach the two conical portions fitted against each other and drive the pin 6 through the aperture 11 of the plate 2 to open the chain C¹ by separation of the links M² and F¹.

Figure 2:
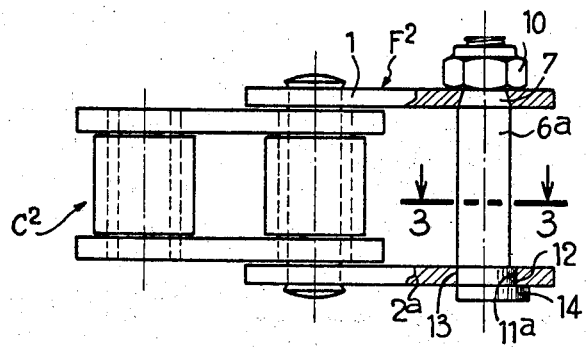
FIG. 2 is a view similar to FIG. 1, of a first variant.
Figure 3:
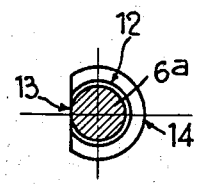
FIG. 3 is a partial sectional view taken along line 3—3 of FIG. 2.

In the variant shown in FIGS. 2 and 3 the outside link F² of the chain C² comprises a pin 6a which has at the end thereof opposed to the conical portion 7 a bearing portion 12 of circular shape provided with a flat portion 13 for keying the pin in a smooth aperture 11a of the same shape formed in the plate 2a. The keying of the pin 6a ensures that the pin 6a is prevented from rotating with respect to the plates 1 and 2a whereas in the first embodiment rotation was prevented merely by the tight fit between the conical portions 7 and 9. Further, the pin 6a has a head 14 of the same shape.

Figure 4:
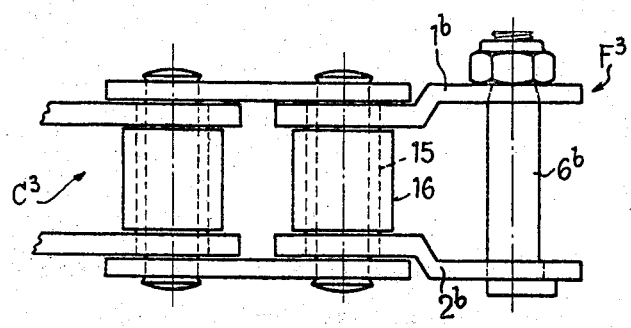
FIG. 4 is a plan view of another variant concerning an offset link.

FIG. 4 shows an offset link F³ according to the invention for a chain C³. It comprises two offset plates 1b and 2b interconnected by a bushing 15 which is tightly fit in these plates and on which is freely rotative a roller 16. The pin 6b is identical to, and mounted in the same manner as, the pin 6a of the preceding embodiment.

Figure 5:
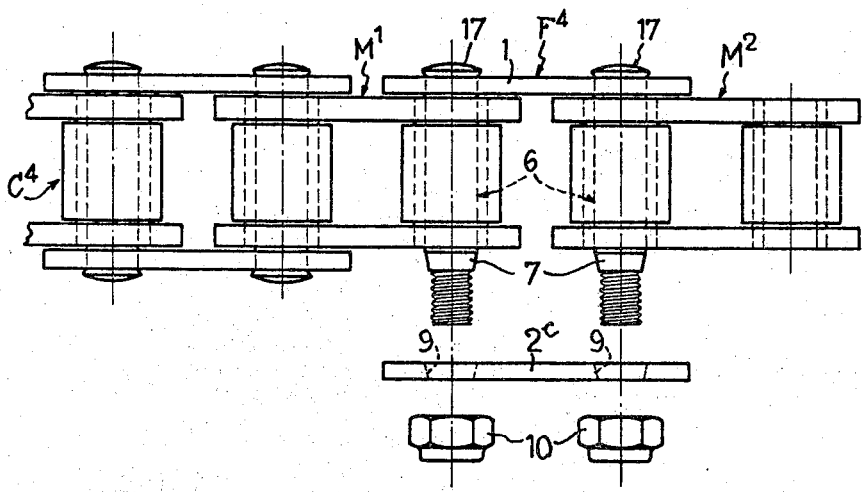
FIG. 5 is an exploded plan view of a chain provided with a link having two pins mounted in accordance with the invention, said pins being held in position by two nuts.

FIG. 5 shows a chain C⁴ constituted alternately by inside and outside links. The two inside end links M¹ and M² are interconnected by a link F⁴ provided with two pins 6 having a conical fit in two conical apertures in the plate 2c, these pins being riveted at 17 onto the plate 1.

It will be easily understood that when the two nuts 10 are tightened, the link F⁴ is absolutely rigid and the pins are held exactly parallel. When disassembling, it is sufficient to unscrew the two nuts and slightly tap the plate 2c or the two pins 6 to disengage without effort the conical portions 7 of the pins 6 from the conical apertures 9 of the plate 1.

Figure 6:
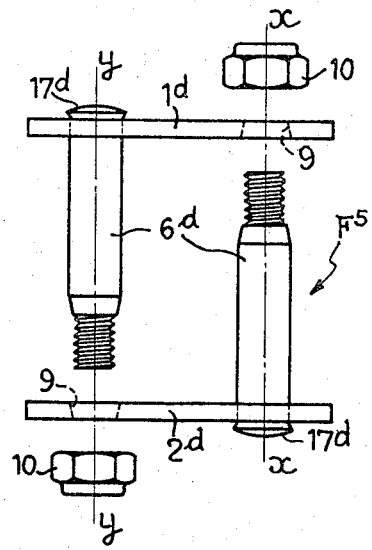
FIGS. 6 and 7 are two exploded plan views of other links according to the invention.

FIG. 6 shows an outside link F⁵ comprising two plates 1d and 2d each of which has a conical aperture 9. Mounted with a tight fit on one side of each of the plates is one of two pins 6d disposed in inverted relation to each other, the pins being riveted to one or the other of the plates at 17d. As before, there is obtained by tightening two nuts 10, a chain link which is absolutely rigid and has axes x—x and y—y exactly parallel. This link is also easily disassembled.

Figure 7:
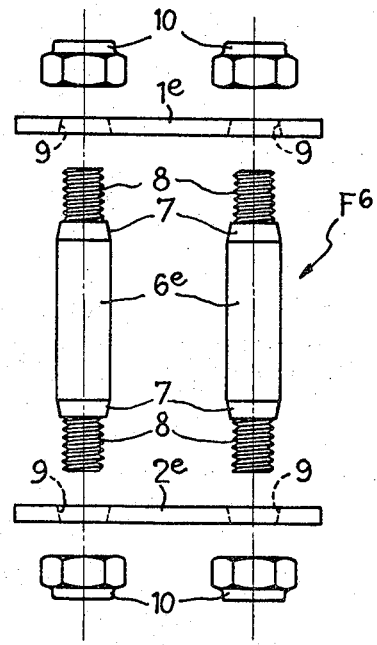

FIG. 7 shows a chain link F⁶ comprising two identical plates 1e and 2e each of which has two conical apertures 9 and two identical pins 6e. These two pins comprise at each end a conical portion 7 and a screwthread portion 8. It will be easily understood that if these pins are placed in the corresponding apertures of the plates and the four nuts 10 are tightened, there is obtained a chain link which is, as those shown in the other figures, absolutely rigid and in which the pins are exactly parallel to each other. Such a link is also easily disassembled.

Although specific embodiments of the invention have been described, many modifications and changes may be made therein without departing from the scope of the invention as defined in the appended claims.

Having now described my invention what I claim as new and desire to secure by Letters Patent is:

1. A link for a transmission chain comprising two link plates each having two apertures therein, and two elements in said apertures, disposed perpendicular to the plates and interconnecting the plates, at least one of said elements being a pin having adjacent an end portion thereof, a conical portion which is convergent outwardly of the link towards said end portion of the pin and engaged in one of said apertures which has a conical shape, the same apex angle and the same diameter as said conical portion, and axial clamping means axially fixed to said end portion of said pin and engaged against the side of the corresponding plate having said conical aperture opposed to said conical portion of the pin and tightly applying the conical portion in said conical aperture.

2. A link as claimed in claim 1, wherein the pin at the end thereof opposed to said conical portion has a fit without clearance in the corresponding one of said apertures in the corresponding plate, the other element being a tight fit in the corresponding two apertures in the two plates.

3. A link as claimed in claim 1, wherein the elements are both pins and have a tight fit at one end in the corresponding plate and have at the opposite ends of the pins conical portions engaged in conical apertures in the other plate.

4. A link as claimed in claim 3, wherein the pins are in inverted relation to each other, the conical portion of one pin being engaged in the aperture of the plate in which the other pin has a tight fit.

5. A link as claimed in claim 1, wherein both elements are pins, each of which has conical portions at both ends, the plates each having two conical apertures engaged on the corresponding conical portions of the pins.

6. A link as claimed in claim 1, wherein said pin has a conical portion at only one end, positive keying means being provided for preventing the rotation of the pin relative to that plate which does not have said conical aperture engaged on the conical portion.

7. A link as claimed in claim 1, wherein the pin comprises a conical portion at only one end and a bearing portion including a flat part at the other end thereof which is engaged in a corresponding aperture having a flat part in that plate which does not have said conical aperture engaged on the conical portion.

8. A link as claimed in claim 1, wherein the clamping means comprise a screw-threaded portion on said end portion of the pin adjacent the conical portion and a nut screwthreadedly engaged on the screwthreaded portion and bearing inwardly of the link against the plate having the conical aperture.

9. A transmission chain having articulated links and a connectinge link interconnecting the end links of the chain and rendering the chain an endless chain, said connecting link comprising two link plates each having two apertures therein, and two elements in said apertures disposed perpendicular to the plates and interconnecting the plates, at least one of said elements being a pin having adjacent an end portion thereof a conical portion which is convergent outwardly of the link towards said end portion of the pin and engaged in one of said apertures which has a conical shape, the same apex angle and the same diameter as said conical portion, and axial clamping means axially fixed to said end portion of said pin and engaged against the side of the corresponding plate having said conical aperture opposed to said conical portion of the pin and tightly applying the conical portion in said conical aperture.

References Cited

UNITED STATES PATENTS

| | | | |
|---|---|---|---|
| 664,256 | 12/1900 | Gates | 74—254 |
| 1,524,027 | 1/1925 | Dod | 74—255 X |
| 2,541,911 | 2/1951 | Bingham | 74—251 |
| 2,647,023 | 7/1953 | Kubaugh | 74—254 X |
| 2,719,063 | 9/1955 | Dearlove | 74—254 X |

FOREIGN PATENTS

| | | |
|---|---|---|
| 953,514 | 12/1949 | France. |
| 446,491 | 3/1949 | Italy. |

FRED C. MATTERN, Jr., *Primary Examiner.*

J. A. WONG, *Assistant Examiner.*